United States Patent
Taraiya et al.

(10) Patent No.: US 6,969,745 B1
(45) Date of Patent: Nov. 29, 2005

(54) THERMOPLASTIC COMPOSITIONS

(75) Inventors: Ajay Taraiya, Bangalore (IN); Jitendra Gupta, Chandigarh (IN)

(73) Assignee: General Electric Company, Schenectady, NY (US)

( * ) Notice: Subject to any disclaimer, the term of this patent is extended or adjusted under 35 U.S.C. 154(b) by 18 days.

(21) Appl. No.: 10/882,529

(22) Filed: Jun. 30, 2004

(51) Int. Cl.$^7$ ............................ C08L 67/03; C08L 69/00
(52) U.S. Cl. ...................... 525/439; 524/537; 525/446; 525/464
(58) Field of Search ............................... 525/439, 446, 525/464; 524/537

(56) References Cited

U.S. PATENT DOCUMENTS

| | | |
|---|---|---|
| 2,043,083 A | 6/1936 | Wappler |
| 2,465,319 A | 3/1949 | Whinfield |
| 3,047,539 A | 7/1962 | Pengilly |
| 3,476,627 A | 11/1969 | Squires |
| 3,565,985 A | 2/1971 | Schrenk et al. |
| 3,635,895 A | 1/1972 | Kramer |
| 3,668,288 A | 6/1972 | Takahashi |
| 3,918,865 A | 11/1975 | Nissel |
| 3,933,964 A | 1/1976 | Brooks |
| 4,001,184 A | 1/1977 | Scott |
| 4,188,314 A | 2/1980 | Fox et al. |
| 4,217,438 A | 8/1980 | Brunelle et al. |
| 4,254,775 A | 3/1981 | Langer |
| 4,267,906 A | 5/1981 | Fischer |
| 4,477,521 A | 10/1984 | Lehmann et al. |
| 4,565,684 A | 1/1986 | Tibbetts et al. |
| 4,572,813 A | 2/1986 | Arakawa |
| 4,579,906 A | 4/1986 | Zabrocki et al. |
| 4,663,230 A | 5/1987 | Tennent |
| 4,707,393 A | 11/1987 | Vetter |
| 4,816,289 A | 3/1989 | Komatsu et al. |
| 4,876,078 A | 10/1989 | Arakawa et al. |
| 5,024,818 A | 6/1991 | Tibbetts et al. |
| 5,025,066 A | 6/1991 | DeRudder et al. |
| 5,165,909 A | 11/1992 | Tennent et al. |
| 5,191,036 A * | 3/1993 | Yamamoto et al. ......... 525/439 |
| 5,391,600 A | 2/1995 | Umeda et al. |
| 5,441,997 A | 8/1995 | Walsh et al. |
| 5,455,310 A * | 10/1995 | Hoover et al. .............. 525/431 |
| 5,521,230 A | 5/1996 | Bhatia et al. |
| 5,589,152 A | 12/1996 | Tennent et al. |
| 5,591,382 A | 1/1997 | Nahass et al. |
| 5,942,585 A | 8/1999 | Scott et al. |
| 6,040,382 A | 3/2000 | Hanes |
| 6,043,322 A | 3/2000 | Scott et al. |
| 6,518,340 B1 | 2/2003 | Fishburn et al. |
| 6,673,864 B2 | 1/2004 | Patel et al. |
| 6,716,902 B2 | 4/2004 | Fishburn et al. |
| 2003/0032725 A1 | 2/2003 | Gaggar et al. |
| 2003/0181603 A1 | 9/2003 | Venderbosch et al. |
| 2003/0195295 A1 | 10/2003 | Mahood et al. |

FOREIGN PATENT DOCUMENTS

GB 2331303 5/1999

OTHER PUBLICATIONS

ASTMD1238-01"Standard Test Method for Melt Flow Rates of Thermoplastics by Extrusion Plastometer" pp. 1-12.
ASTMD256-03 "Standard Test Methods for Determining the Izod Pendulum Impact Resistance of Plastics" pp. 1-20.
ASTME313-00 "Standard Practice for Calculation Yellowness and Whiteness Indices from Instrumentally Measured Color Coordinates" pp. 1-5.
JP04249537. Publication Date: Sep. 4, 1992. "Glass-Reinforced Polycarbonate Resin Composition" (Abstract Only).
JP05255583. Publication date: Oct. 5, 1993. "Polycarbonate Resin Compositon" (Abstract Only).
JP09095607. Publication Date: Apr. 8, 1997. "Transparent Glass-Reinforcing Resin Composition" (Abstract Only).

* cited by examiner

*Primary Examiner*—Ana Woodward

(57) ABSTRACT

A thermoplastic composition comprising, 1 to 30 weight percent of a cycloaliphatic polyester; and greater than or equal to 40 weight percent of a polyorganosiloxane/polycarbonate block copolymer.

23 Claims, No Drawings

THERMOPLASTIC COMPOSITIONS

BACKGROUND

The disclosure generally relates to thermoplastic compositions that are transparent and/or translucent.

Polycarbonate polymers are transparent engineering thermoplastic materials that combine desirable mechanical, optical, thermal, and electrical properties. Frequently polycarbonate polymers are blended with other materials to improve some mechanical properties such as impact resistance. The resulting blend typically exhibits reduced transparency or even opacity when compared to polycarbonate. In fact, transparency may be lost upon the addition of even small amounts of rubbery impact modifier. There is a growing need for transparent/translucent materials. Currently available polycarbonate compositions typically exhibit a certain level of translucency or opacity, which cannot be manipulated over a visually significant range, without a significant variation in composition and physical properties.

There is an unprecedented demand for thermoplastic compositions having better clarity in addition to excellent physical properties, especially in cases where visual effects additives need to be incorporated into the thermoplastic compositions for aesthetic purposes.

There remains a need for a transparent or translucent thermoplastic composition that has excellent physical properties, especially at lower temperatures.

BRIEF SUMMARY

In one aspect the disclosure relates to a thermoplastic composition comprising 1 to 30 weight percent of a cycloaliphatic polyester and greater than or equal to 40 weight percent of a polyorganosiloxane/polycarbonate block copolymer. The composition typically has a B-Y span of less than or equal to 20.

In another aspect the disclosure related to a thermoplastic composition comprising, 1 to 30 weight percent of a cycloaliphatic polyester and greater than or equal to 40 weight percent of a polyorganosiloxane/polycarbonate block copolymer. The polyorganosiloxane/polycarbonate block copolymer comprises polyorganosilozane domains having an average domain size less than or equal to 45 nanometers.

In another aspect the disclosure relates to a transparent thermoplastic composition comprising, 1 to 30 weight percent of a cycloaliphatic polyester and greater than or equal to 40 weight percent of a polyorganosiloxane/polycarbonate block copolymer wherein the composition has a light transmission of greater than or equal to 25% as measured by ASTM E313-00 on a 3.2 millimeter (mm) thick plaque.

In another aspect the disclosure relates to a method of making a thermoplastic composition comprising mixing 1 to 30 weight percent of a cycloaliphatic polyester and greater than or equal to 40 weight percent of a polyorganosiloxane/polycarbonate block copolymer.

The above-described composition may be understood more readily by reference to the following detailed description of the various features of the disclosure and the examples included therein.

DETAILED DESCRIPTION

Disclosed herein are thermoplastic compositions comprising a polyorganosiloxane/polycarbonate block copolymer and a cycloaliphatic polyester. The thermoplastic composition described herein exhibits a desirable combination of low temperature ductility and transparency. The thermoplastic compositions may have a light transmission of greater than or equal to 25% as measured by ASTM E313-00 on a 3.2 millimeter (mm) thick plaque. Within this range, the light transmission may be greater than or equal to 50 percent, or, more specifically, greater than or equal to 70 percent, or, even more specifically, greater than or equal to 85 percent. The composition has a ductility of greater than or equal to 420 Joules per meter (8 foot pounds per inch) when measured at −20° C. Within this range the ductility may be greater than or equal to 480 Joules per meter (9 foot pounds per inch), or, more specifically, greater than on equal to 750 Joules per meter (14 foot pounds per inch), or, even more specifically, greater than or equal to 1020 Joules per meter (19 foot pounds per inch) as determined by ASTM D256-03. All ASTM methods referred to herein are the methods provided in the respective years i.e. ASTM D256-03 implies ASTM D256 as available in the year 2003.

The singular forms "a", "an" and "the" include plural referents unless the context clearly dictates otherwise.

"Optional" or "optionally" as used herein means that the subsequently described event or circumstance may or may not occur, and that the description includes instances where the event occurs and instances where it does not.

The polyorganosiloxane/polycarbonate block copolymer comprises polycarbonate blocks and polyorganosiloxane blocks. The polycarbonate blocks comprise repeating structural units of the formula (I),

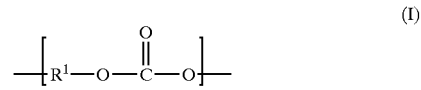

in which at least 60 percent of the total number of $R^1$ groups are aromatic organic radicals and the balance thereof are aliphatic, alicyclic, or aromatic radicals. $R^1$ may be an aromatic organic radical of the formula (II),

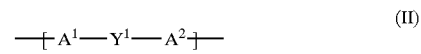

wherein each of $A^1$ and $A^2$ is a monocyclic divalent aryl radical and $Y^1$ is a bridging radical having one or two atoms which separate $A^1$ from $A^2$. In one embodiment, one atom separates $A^1$ from $A^2$. Illustrative non-limiting examples of radicals of this type include —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be an unsaturated hydrocarbon group or a saturated hydrocarbon group such as methylene, cyclohexylidene or isopropylidene.

The polyorganosiloxane blocks comprise repeating structural units of the formula (III),

wherein $R^2$ is independently at each occurrence a monovalent organic radical having 1 to 13 carbon atoms, and "n" is an integer greater than or equal to 1, or, more specifically, greater than or equal to 10, or, even more specifically, greater than or equal to 25. In one embodiment n is greater than or equal to 40. The integer "n" may also be less then or equal to 1000, or, more specifically, less than or equal to 100, or, even more specifically, less than or equal to 75 or, even more specifically less than or equal to 60. As is readily understood by one of ordinary skill in the art, "n" represents an average value.

In one embodiment, the polyorganosiloxane blocks comprise repeating structural units of the formula (IV),

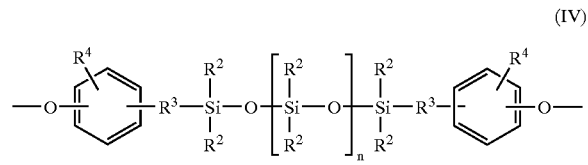

wherein $R^2$ and "n" are as defined above. $R^3$ is independently at each occurrence a divalent aliphatic radical having 1 to 8 carbon atoms or aromatic radical having 6 to 8 carbon atoms. In one embodiment each occurrence of $R^3$ is in the ortho or para position relative to the oxygen. $R^4$ is independently at each occurrence a hydrogen, halogen, alkoxy having 1 to 8 carbon atoms, alkyl having 1 to 8 carbon atoms or aryl having 6 to 13 carbon atoms and "n" is an integer less than or equal to 1000, specifically less than or equal to 100, or, more specifically, less than or equal to 75 or, even more specifically, less than or equal to 60. As is readily understood by one of ordinary skill in the art, n represents an average value.

In one embodiment in the above formula (IV), $R^2$ is independently at each occurrence an alkyl radical having 1 to 8 carbons, $R^3$ is independently at each occurrence a dimethylene, trimethylene or tetramethylene, $R^4$ is independently at each occurrence a halogen radical, such as bromo and chloro; alkyl radical such as methyl, ethyl, and propyl; alkoxy radical such as methoxy, ethoxy, and propoxy; aryl radical such as phenyl, chlorophenyl, and tolyl. In one embodiment $R^3$ is methyl, a mixture of methyl and trifluoropropyl, or a mixture of methyl and phenyl.

The polyorganosiloxane/polycarbonate copolymers may have a weight-average molecular weight (Mw), measured, for example, by ultra-centrifugation or light scattering, or greater than or equal to 10,000, or, more specifically, greater than or equal to 20,000. The weight average molecular weight may be less than or equal to 200,000, or, more specifically, less than or equal to 100,000. It is generally desirable to have polydimethylsilozane units contribute 0.5 to 80 weight percent of the total weight of the polyorganosiloxane/polycarbonate copolymer or an equal molar amount of other polydiorganolsiloxanes.

The polyorganosiloxane/polycarbonate block copolymer comprises polyorganosiloxane domains having an average domain size of less than or equal to 45 nanometers. Within this range the polyorganosiloxane domains may be greater than or equal to 10 nanometers. Also within this range the polyorganosiloxane domains may be less than or equal to 40 nanometers, or, more specifically, less than or equal to 20 nanometers.

Domain size may be determined by Transmission Electron Microscopy (TEM) as follows. A sample of the polyorganosiloxane/polycarbonate block copolymer is injection molded into a sample 60 millimeters square and having a thickness of 3.2 millimeters. A block (5 millimeters by 10 millimeters) is cut from the middle of the sample. The block is then sectioned from top to bottom by an ultra microtome using a diamond knife at room temperature. The sections are 100 nanometers thick. At least 5 sections are scanned by TEM at 100 to 120 kilovolts (kV) and the images recorded at 66,000X magnification. The polysiloxane domains were counted and measured, the domain size reflecting the longest single linear dimension of each domain. The domain sizes over the 5 sections were then averaged to yield the average domain size.

The thermoplastic composition comprises polyorganosiloxane/polycarbonate block copolymer in an amount of 70 to 99 weight percent. Within this range, the polyorganosiloxane/polycarbonate block copolymer may be present in an amount greater than or equal to 75 weight percent, or, more specifically, in an amount greater than or equal to 80 weight percent. Also within this range the polyorganosiloxane/polycarbonate block copolymer may be present in an amount less than or equal to 95 weight percent, or, more specifically, less than or equal to 90 weight percent. The weight percents are based on the total weight of the thermoplastic composition.

Also specifically envisioned are polyorganosiloxane/polycarbonate block copolymers prepared by direct synthesis comprising a polycarbonate matrix and the desired embedded polysiloxane domains. In a blend of two polyorganosiloxane/polycarbonate copolymers the individual copolymers are generally difficult to separate or to distinguish. With Transmission Electron Microscopy (TEM) it is however possible to distinguish in the blend a polycarbonate matrix and embedded polysiloxane domains.

Polyorganosiloxane/polycarbonate copolymers may be made by a variety of methods such as interfacial polymerization, melt polymerization and solid-state polymerization. For example, the polyorganosiloxane/polycarbonate copolymers may be made by introducing phosgene under interfacial reaction conditions into a mixture of a dihydric aromatic compound, such as bisphenol A (hereinafter at times referred to as BPA), and a hydroxyaryl-terminated polyorganosiloxane. The polymerization of the reactants may be facilitated by use of a tertiary amine catalyst or a phase transfer catalyst.

The hydroxyaryl-terminated polyorganosiloxane may be made by effecting a platinum catalyzed addition between a siloxane hydride of the formula (V),

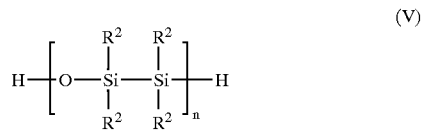

and an aliphatically unsaturated monohydric phenol wherein $R^2$ and n are as previously defined.

Non-limiting examples of the aliphatically unsaturated monohydric phenols, which may be used to make the hydroxyaryl-terminated polyorganosiloxanes include, for example, 4-allyl-2-methoxy phenol (herein after referred to as eugenol); 2-alkylphenol, 4-allyl-2-methylphenol; 4-allyl-2-phenylphenol; 4-allyl-2-bromophenol; 4-allyl-2-t-butoxyphenol; 4-phenyl-2-phenylphenol; 2-methyl-4-propylphenol; 2-allyl-4,6-dimethylphenol; 2-allyl-4-bromo-6-methylphenol; 2-allyl-6-methoxy-4-methylphenol and 2-allyl-4,6-dimethylphenol. Mixtures of aliphatically unsaturated monohydric phenols may also be used.

Among the suitable phase transfer catalysts which may be utilized are catalysts of the formula $(R^5)_4Q^+X$, where $R^5$ is independently at each occurrence an alkyl group having 1 to 10 carbons, Q is a nitrogen or phosphorus atom, and X is a halogen atom, or an —$OR^6$ group, where $R^6$ is selected from a hydrogen, an alkyl group having 1 to 8 carbon atoms and an aryl group having 6 to 18 carbon atoms. Some of the phase transfer catalysts which may be used include [$CH_3(CH_2)_3]_4NX$, [$CH_3(CH_2)_3]_4PX$, [$CH_3(CH_2)_5]_4NX$, [$CH_3(CH_2)_6]_4NX$, [$CH_3(CH_2)_4]_4NX$, $CH_3[CH_3(CH_2)_3]_3NX$, $CH_3[CH_3(CH_2)_2]_3NX$ where X is selected from $Cl^-$, $Br^-$ or —$OR^6$. Mixtures of phase transfer catalysts may also be used. An effective amount of a phase transfer catalyst is greater than or equal to 0.1 weight percent (wt %) and in one embodiment greater than or equal to 0.5 wt % based on the weight of bisphenol in the phosgenation mixture. The amount of phase transfer catalyst may be less than or equal to 10 wt % and more specifically less than or equal to 2 wt % based on the weight of bisphenol in the phosgenation mixture.

Non-limiting examples of dihydric aromatic compounds which may be subjected to phosgenation include, resorcinol; 4-bromoresorcinol; hydroquinone; 4,4'-dihydroxybiphenyl; 1,6-dihydroxynaphthalene; 2,6-dihydroxynaphthalene; bis(4-hydroxyphenyl)methane; bis(4-hydroxyphenyl)diphenylmethane; bis(4-hydroxyphenyl)-1-naphthylmethane; 1,1-bis(4-hydroxyphenyl)methane; 1,1-bis(4-hydroxyphenyl)ethane; 1,2-bis(4-hydroxyphenyl)ethane; 1,1-bis(4-hydroxyphenyl)-1-phenylethane; 2,2-bis(4-hydroxyphenyl)propane; 2-(4-hydroxyphenyl)-2)3-hydroxyphenyl)propane; 2,2-bis(4-hydroxyphenyl)butane; 2,2-bis(4-hydroxyphenyl)octane; 1,1-bis(4-hydroxyphenyl)propane; 1,1-bis(4-hydroxyphenyl)n-butane; bis(4-hydroxyphenyl)phenylmethane; 2,2-bis(4-hydroxy-1-methylphenyl) propane; 1,1-bis(4-hydroxy-tert-butylphenyl)propane; 2,2-bis(4-hydroxy-3-bromophenyl)propane; 1,1-bis(hydroxyphenyl)cyclopentane; 1,1-bis(4-hydroxyphenyl)cyclohexane; 1,1-bis(4-hydroxyphenyl)isobutene; 1,1-bis(4-hydroxyphenyl)cyclododecane; trans-2,3-bis(4-hydroxyphenyl)2-butene; 2,2-bis(4-hydroxyphenyl)adamantine; (alpha, alpha'-bis(4-hydroxyphenyl)toluene. bis(4-hydroxyphenyl)acetonitrile; 2,2-bis(3-methyl-4-hydroxyphenyl)propane; 2,2-bis(3-ethyl-4-hydroxyphenyl)propane; 2,2-bis(3-n-propyl-4-hydroxyphenyl)propane; 2,2-bis(3-isopropyl-4-hydroxyphenyl)propane; 2,2-bis(3-sec-butyl-4-hydroxyphenyl)propane; 2,2-bis(3-t-butyl-4-hydroxyphenyl)propane; 2,2-bis(3-cyclohexyl-4-hydroxyphenyl)propane; 2,2-bis(3-allyl-4-hydroxyphenyl)propane; 2,2-bis(3-methoxy-4-hydroxyphenyl)propane; 2,2-bis(4-hydroxyphenyl)hexafluoropropane; 1,1-dichloro-2,2-bis(4-hydroxyphenyl)ethylene; 1,1-dibromo-2,2-bis(4-hydroxyphenyl)ethylene; 1,1-dichloro-2,2-bis(5-phenoxy-4-hydroxyphenyl)ethylene; 4,4'-dihydroxybenzophenone; 3,3-bis(4-hydroxyphenyl)-2-butanone; 1,6-bis(4-hydroxyphenyl)-1,6-hexanedione; ethylene glycol bis(4-hydroxyphenyl)ether; bis(4-hydroxyphenyl)ether; bis(4-hydroxyphenyl)sulfide; bis(4-hydroxyphenyl)sulfoxide; bis(4-hydroxyphenyl)sulfone; 9,9-bis(4-hydroxyphenyl)fluorine; 2,7-dihydroxypyrene; 6,6'-dihydroxy-3,3,3',3'-tetramethylspiro(bis)indane("spirobiindane bisphenol"); 3,3-bis(4-hydroxyphenyl)phthalide; 2,6-dihydroxydibenzo-p-dioxin; 2,6-dihydroxythianthrene; 2,7-dihydroxyphenoxathin; 2,7-dihydroxy-9,10-dimethylphenazine; 3,6-dihydroxydibenzofuran; 3,6-dihydroxydibenzothiophene and 2,7-dihydroxycarbazole. Mixtures of dihydric aromatic compounds may also be used.

The polyorganosiloxane/polycarbonate block copolymer may be produced by blending aromatic dihydroxy compound with an organic solvent and an effective amount of phase transfer catalyst or an aliphatic tertiary amine, such as triethylamine, under interfacial conditions. Sufficient alkali metal hydroxide may be utilized to raise the pH of the bisphenol reaction mixture prior to phosgenation, to 10.5 pH. This may result in the dissolution of some of the bisphenol into the aqueous phase. Suitable organic solvents that may be used are, for example, chlorinated aliphatic hydrocarbons, such as methylene chloride, chloroform, carbon tetrachloride, dichloroethane, trichloroethane, tetrachloroethane, dichloropropane and 1,2-dichloroethylene; substituted aromatic hydrocarbons such as chlorobenzene, o-dichlorobenzene, and the various chlorotoluenes. Mixtures of organic solvents may also be used. In one embodiment the solvent comprises methylene chloride.

Aqueous alkali metal hydroxide or alkaline earth metal hydroxide addition may be used to maintain the pH of the phosgenation mixture near the pH set point, which may be in the range of 10 to 12. Some of the alkali metal or alkaline earth metal hydroxides, which may be employed, are for example, sodium hydroxide, potassium hydroxide, and calcium hydroxide. In one embodiment the alkali metal hydroxide used comprises sodium hydroxide.

During the course of phosgene introduction at a pH of 10 to 12, and depending upon the rate of phosgene addition, the pH may be lowered to allow for the introduction of the hydroxyaryl-terminated polyorganosiloxane. End-capping agents such as phenol, p-butylphenol, p-cumylphenol, octylphenol, nonylphenol and other mono hydroxy aromatic compounds may be used to regulate the molecular weight or to terminate the reaction.

Alternatively the polyorganosiloxane/polycarbonate copolymer may be produced by an aromatic dihydroxy compound in the presence of a phase transfer catalyst at a pH of 5 to 8 to form bischloroformate oligomers. Then to this is added a hydroxyaryl-terminated polyorganosiloxane, which is allowed to react at a pH of 9 to 12 for a period of time sufficient to effect the reaction between the bischloroformate oligomers and the hydroxyalryl-terminated polydiorganosiloxane, typically a time period of 10 to 45 minutes. Generally there is a large molar excess of chloroformate groups relative to hydroxyaryl groups. The remaining aromatic dihydroxy compound is then added, and the disappearance of chloroformates is monitored, usually by phosgene paper. When substantially all chloroformates have reacted, an end-capping agent and optionally a trialkylamine are added and the reaction phosgenated to completion at a pH of 9 to 12.

The polyorganosiloxane/polycarbonate copolymer may be made in a wide variety of batch, semi-batch or continuous reactors. Such reactors are, for example, stirred tank, agitated column, tube and recirculating loop reactors. Recovery of the polyorganosiloxane/polycarbonate copolymer may be achieved by any means known in the art such as through the use of an anti-solvent, steam precipitation or a combination of anti-solvent and steam precipitation.

The thermoplastic composition may comprise blends of two or more polyorganosiloxane/polycarbonate block copolymers.

The cycloaliphatic polyester in the thermoplastic composition essentially consists of a polyester having repeating units of the formula VI,

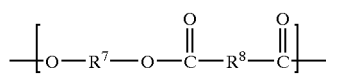

(VI)

wherein $R^7$ and $R^8$ are independently at each occurrence an yl; aliphatic or cycloalkane having 2 to 20 carbon atoms and chemical equivalents thereof, with the proviso that at least one of $R^7$ and $R^8$ is a cycloalkyl containing radical. The cycloaliphatic polyester is a condensation product when $R^7$ is the residue of a diol or chemical equivalents and $R^8$ is decarboxylated residue of a diacid or chemical equivalents. In one embodiment cycloaliphatic polyesters are those having both $R^7$ and $R^8$ as cycloalkyl containing radicals.

Cycloaliphatic polyesters may be formed from mixtures of aliphatic diacids and aliphatic diols but must contain at least 50 mole % of cyclic diacid and/or cyclic diol components, the remainder, if any, being linear aliphatic diacids and/or diols.

The cycloaliphatic polyesters may be obtained through the condensation or ester interchange polymerization of the diol or diol chemical equivalent component with the diacid or diacid chemical equivalent component.

In one embodiment $R^7$ and $R^8$ are cycloalkyl radicals independently selected from the following formulae VII to XVL

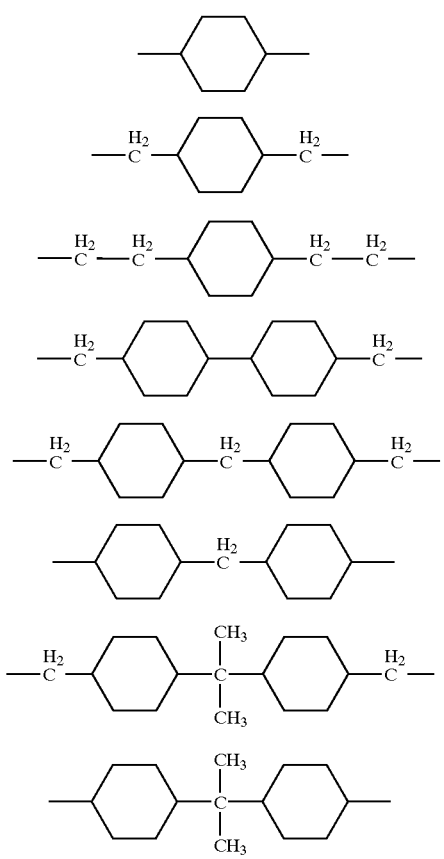

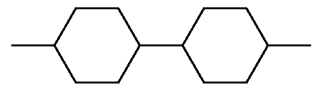

(XV)

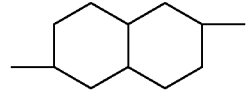

(XVI)

In one embodiment the cycloaliphatic radical $R^8$ is derived from the 1,4-cyclohexyl diacids with generally greater than 70 mole % thereof in the form of the trans isomer and the cycloaliphatic radical $R^7$ is derived from the 1,4-cyclohexyl primary diols such as 1,4-cyclohexyl dimethanol with greater than 70 mol % thereof in the form of the trans isomer. The cycloaliphatic polyesters have a weight-average molecular weight (Mw), measured, for example, by ultra-centrifugation or light scattering of 25,000 Daltons to 85,000 Daltons and most specifically 60,000 to 80,000 Daltons.

Other diols that may be used in the preparation of the cycloaliphatic polyester are straight chain, branched, or cycloaliphatic alkane diols and may contain 2 to 20 carbon atoms. Examples of such diols include, but are not limited to, ethylene glycol; propylene glycol, i.e., 1,2- and 1,3-propylene glycol; 2,2-dimethyl-1,3-propane diol; 2-ethyl-2-methyl-1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; 2,2,4,4-tetramethyl-1,3-cyclobutanediol (TMCBD); triethylene glycol; 1,10-decane diol; and mixtures of any of the foregoing. In one embodiment the diol or chemical equivalent thereof used is 1,4-cyclohexane dimethanol or its chemical equivalents.

Chemical equivalents to the diols include esters, such as dialkylesters, diaryl esters and the like.

In one embodiment the diacids are cycloaliphatic diacids. This is includes carboxylic acids having two carboxyl groups each of which is attached to a saturated carbon. Specific diacids are cyclo or bicyclo aliphatic acids, non-limiting examples of which include, decahydro naphthalene dicarboxylic acids, norbornene dicarboxylic acids, bicyclo octane dicarboxylic acids, 1,4-cyclohexanedicarboxylic acid or chemical equivalents. Most specifically the diacids include trans-1,4-cyclohexanedicarboxylic acid or chemical equivalent. Linear dicarboxylic acids like adipic acid, azelaic acid, dicarboxyl dodecanoic acid and succinic acid may also be useful.

Cyclohexane dicarboxylic acids and their chemical equivalents may be prepared, for example, by the hydrogenation of cycloaromatic diacids and corresponding derivatives such as isophthalic acid, terephthalic acid or naphthalenic acid in a suitable solvent such as water or acetic acid using a suitable catalysts such as rhodium supported on a carrier such as carbon or alumina. They may also be prepared by the use of an inert liquid medium in which a phthalic acid is at least partially soluble under reaction conditions and with a catalyst of palladium or ruthenium on carbon or silica.

Typically, in the hydrogenation, two isomers are obtained in which the carboxylic acid groups are in cis- or trans-positions. The cis- and trans-isomers may be separated by crystallization with or without a solvent, for example, using n-heptane, or by distillation. The cis- and trans-isomers have different physical properties and may be used independently or as a mixture. Mixtures of the cis- and trans-isomers are useful herein as well.

When the mixture of isomers or more than one diacid or diol is used, a copolyester or a mixture of two polyesters may be used as the cycloaliphatic polyester.

Chemical equivalents of these diacids may include esters, alkyl esters, e.g., dialkyl esters, diaryl esters, anhydrides, salts, acid chlorides, acid bromides, and the like. In one embodiment the chemical equivalent comprises the dialkyl esters of the cycloaliphatic diacids, and most specifically the chemical equivalent comprises the dimethyl ester of the acid, such as dimethyl-1,4-cyclohexane-dicarboxylate.

In one embodiment the cycloaliphatic polyester is poly(cyclohexane-1,4-dimethylene cyclohexane-1,4-dicarboxylate) also referred to as poly(1,4-cyclohexane-dimethanol-1,4-dicarboxylate) (hereinafter referred to as PCCD) which has recurring units of formula XVII,

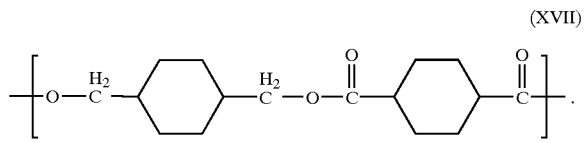

(XVII)

With reference to formula VI for PCCD, $R^7$ is derived from 1,4-cyclohexane dimethanol; and $R^8$ is a cyclohexane ring derived from cyclohexanedicarboxylate or a chemical equivalent thereof. The favored PCCD has a cis/trans formula.

The polyester polymerization reaction may be run in melt in the presence of a suitable catalyst such as a tetrakis (2-ethyl hexyl) titanate, in a suitable amount, generally 50 to 200 ppm of titanium based upon the total weight of the polymerization mixture.

In one embodiment the cycloaliphatic polyester has a glass transition temperature (Tg) greater than or equal to 50° C., or, more specifically greater than or equal to 80° C., or, even more specifically, greater than or equal to 100° C.

Also contemplated herein are the above polyesters with 1 to 50 percent by weight of units derived from polymeric aliphatic acids and/or polymeric aliphatic polyols to form copolyesters. The aliphatic polyols include glycols, such as poly(ethylene glycol) or poly(butylene glycol). Such polyesters may be made in accordance with the processes disclosed in for example, U.S. Pat. Nos. 2,465,319 and 3,047,539.

The thermoplastic composition comprises cycloaliphatic polyester in an amount of 1 to 30 weight percent. Within this range, the cycloaliphatic polyester may be present in an amount greater than or equal to 5 weight percent, or, more specifically, in an amount greater than or equal to 10 weight percent, or, even more specifically, in an amount greater than or equal to 15 weight percent. Also within this range the polyorganosiloxane/polycarbonate block copolymer may be present in an amount less than or equal to 25 weight percent, or, more specifically, less than or equal to 20 weight percent, or, even more specifically, less than or equal to 12 weight percent. The weight percents are based on the total weight of the thermoplastic composition.

The thermoplastic composition may optionally further comprise a polycarbonate resin. Polycarbonate resins comprise repeating structural units of the formula XVIII,

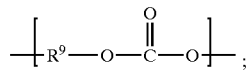

(XVIII)

in which at least 60 percent of the total number of $R^9$ groups are aromatic organic radicals and the balance thereof are aliphatic, alicyclic, or aromatic radicals. In one embodiment, $R^9$ is an aromatic organic radical and, more specifically, a radical of the formula (XIX),

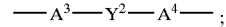

(XIX)

wherein each of $A^3$ and $A^4$ is a monocyclic divalent aryl radical and $Y^2$ is a bridging radical having one or two atoms which separate $A^3$ from $A^4$. In an exemplary embodiment, one atom separates $A^3$ and $A^4$. Illustrative non-limiting examples of radicals of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^2$ may be a hydrocarbon group or a saturated hydrocarbon group such as methylene, cyclohexylidene or isopropylidene.

Polycarbonates may be produced by the interfacial reaction of dihydroxy compounds in which only one atom separates $A^3$ and $A^4$. As used herein, the term "dihydroxy compound" includes, for example, bisphenol compounds having general formula XX as follows:

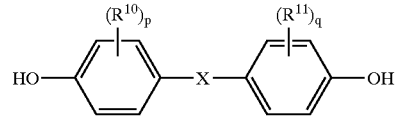

(XX)

wherein $R^{10}$ and $R^{11}$ independently at each occurrence are a halogen atom or a monovalent hydrocarbon group; p and q are each independently integers from 0 to 4; and X represents one of the groups of formula XXI or XXII,

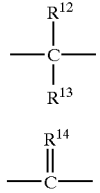

(XXI)

(XXII)

wherein $R^{12}$ and $R^{13}$ independently at each occurrence are a hydrogen atom or a monovalent linear or cyclic hydrocarbon group having 1 to 8 carbons and $R^{14}$ is a divalent hydrocarbon group having 1 to 8 carbons.

Some illustrative, non-limiting examples of suitable dihydroxy compounds include the dihydroxy-substituted aromatic hydrocarbons disclosed by name or formula (generic or specific) in U.S. Pat. No. 4,217,438. A nonexclusive list of specific examples of the types of dihydroxy compounds includes the following: resorcinol; 4-bromoresorcinol; hydroquinone; 4,4'-dihydroxybiphenyl; 1,6-dihydroxynaphthalene; 2,6-dihydroxynaphthalene; bis(4-hydroxyphenyl) methane; bis(4-hydroxyphenyl)diphenylmethane; bis(4-hydroxyphenyl)-1-naphthylmethane; 1,1-bis(4-hydroxyphenyl)methane; 1,1-bis(4-hydroxyphenyl)ethane; 1,2-bis(4-hydroxyphenyl)ethane; 1,1-bis(4-hydroxyphenyl)-1-pheylethane; 2,2-bis(4-hydroxyphenyl)propane; 2-(4-hydroxyphenyl)-2-)3-hydroxyphenyl)propane; 2,2-bis (4-hydroxyphenyl)butane; 2,2-bis(4-hydroxyphenyl) octane; 1,1-bis(4-hydroxyphenyl)propane; 1,1-bis(4-hydroxyphenyl)n-butane; bis(4-hydroxyphenyl)phenylmethane; 2,2-bis(4-hydroxy-1-methylphenyl)propane; 1,1-bis(4-hydroxy-tert-butylphenyl)propane; 2,2-bis(4-hydroxy-3-bromophenyl)propane; 1,1-bis(hydroxyphenyl) cyclopentane; 1,1-bis(4-hydroxyphenyl)cyclohexane; 1,1-bis(4-hydroxyphenyl)isobutene; 1,1-bis(4-hydroxyphenyl) cyclododecane; trans-2,3-bis(4-hydroxyphenyl)-2-butene; 2,2-bis(4-hydroxyphenyl)adamantine; (.alpha.,.alpha.'-bis (4-hydroxyphenyl)toluene. bis(4-hydroxyphenyl)acetonitrile; 2,2-bis(3-methyl-4-hydroxyphenyl)propane; 2,2-bis(3-ethyl-4-hydroxyphenyl)propane; 2,2-bis(3-n-propyl-4-hydroxyphenyl)propane; 2,2-bis(3-isopropyl-4-hydroxyphenyl)propane; 2,2-bis(3-sec-butyl-4-hydroxyphenyl)propane; 2,2-bis(3-t-butyl-4-hydroxyphenyl)propane; 2,2-bis(3-cyclohexyl-4-hydroxyphenyl)propane; 2,2-bis(3-allyl-4-hydroxyphenyl) propane; 2,2-bis(3-methoxy-4-hydroxyphenyl)propane; 2,2-bis(4-hydroxyphenyl)hexafluoropropane; 1,1-dichloro-2,2-bis(4-hydroxyphenyl)ethylene; 1,1-dibromo-2,2-bis(4-hydroxyphenyl)ethylene; 1,1-dichloro-2,2-bis(5-phenoxy-4-hydroxyphenyl)ethylene; 4,4'-dihydroxybenzophenone; 3,3-bis(4-hydroxyphenyl)-2-butanone; 1,6-bis(4-hydroxyphenyl)-1,6-hexanedione; ethylene glycol bis(4-hydroxyphenyl)ether; bis(4-hydroxyphenyl)ether; bis(4-hydroxyphenyl)sulfide; bis(4-hydroxyphenyl)sulfoxide; bis(4-hydroxyphenyl)sulfone; 9,9-bis(4-hydroxyphenyl)fluorine; 2,7-dihydroxypyrene; 6,6'-dihydroxy-3,3,3',3'-tetramethylspiro(bis)indane("spirobiindane bisphenol"); 3,3-bis(4-hydroxyphenyl)phthalide; 2.6-dihydroxydibenzo-p-dioxin; 2,6-dihydroxythianthrene; 2,7-dihydroxyphenoxathin; 2,7-dihydroxy-9,10-dimethylphenazine; 3,6-dihydroxydibenzofuran; 3,6-dihydroxydibenzothiophene and 2,7-dihydroxycarbazole. Mixtures of dihydroxy compounds may also be used.

It is also possible to employ two or more different dihydroxy compounds or a copolymer of a dihydric phenol with a glycol or with a hydroxy-terminated or acid-terminated polyester or with a dibasic acid or hydroxy acid in the event a carbonate copolymer rather than a homopolymer is desired for use. Polyarylates and polyester-carbonate resins or their blends may also be employed. Branched polycarbonates as well as blends of linear polycarbonate and a branched polycarbonate may be employed. The branched polycarbonates may be prepared by adding a branching agent during polymerization.

These branching agents are well known and may comprise polyfunctional organic compounds containing at least three functional groups which may be hydroxyl, carboxyl, carboxylic anhydride, haloformyl and mixtures thereof.

Specific examples include trimellitic acid, trimellitic anhydride, trimellitic trichloride, tris-p-hydroxy phenyl ethane, isatin-bis-phenol. tris-phenol TC (1,3,5-tris(p-hydroxyphenyl)isopropyl)benzene), tris-phenol PA (4(4(1,1-bis(p-hydroxyphenyl)-ethyl) alpha,alpha-dimethyl benzyl) phenol), 4-chloroformyl phthalic anhydride, trimesic acid and benzophenone tetracarboxylic acid. The branching agents may be added at a level of 0.05–2.0 weight percent. Branching agents and procedures for making branched polycarbonates are described in U.S. Pat. Nos. 3,635,895 and 4,001,184. Many types of polycarbonates end groups may be used in the polycarbonate composition.

In one embodiment polycarbonates are based on bisphenol A compound with formula XIX, in which each of $A^3$ and $A^4$ is p-phenylene and $Y^2$ is isopropylidene. The weight average molecular weight of the polycarbonate may be 5,000 to 100,000 daltons, or, more specifically 10,000 to 65,000 daltons, or, even more specifically, 15,000 to 35,000 daltons. When present, the polycarbonate resin is employed in amounts of 10 to 60 weight percent, based on the total weight of the composition. In one embodiment the polycarbonate resin is present in an amount of 10 to 50 weight percent, or, more specifically 30 to 45 weight percent, based on the total weight of the composition.

The thermoplastic composition may further contain various additives which may be used alone or in combination, as long as the additive does not negatively impact the physical properties of the thermoplastic composition by decreasing the low temperature ductility or aesthetic properties of the thermoplastic composition by decreasing the transmittance. These additives include such materials as thermal stabilizers, antioxidants, UV stabilizers, visual effect additives, catalyst quenchers, mold releasing agents, fire retardants (hereinafter sometimes referred to as flame retardants), anti-drip agents, impact modifiers, reinforcing agents and processing aids. The different additives that may be incorporated in the compositions are commonly used and known to those skilled in the art.

Non-limiting examples of antioxidants that can be used in the thermoplastic composition include tris(2,4-di-tert-butylphenyl)phosphite; 3,9-di(2,4-di-tert-butylphenoxy)-2,4,8,10-tetraoxa-3,9-diphosphaspiro[5.5]undecane; 3,9-di(2,4-dicumylphenoxy)-2,4,8,10-tetraoxa-3,9-diphosphaspiro [5.5]undecane; tris(p-nonylphenyl)phosphite; 2,2',2"-nitrilo [triethyl-tris[3,3',5,5'-tetra-tertbutyl-1,1'-biphenyl-2'-diyl] phosphite]; 3,9-distearyloxy-2,4,8,10-tetraoxa-3,9-diphosphaspiro[5.5]undecane; dilauryl phosphite; 3,9-di[2, 6-di-tert-butyl-4-methylphenoxy]-2,4,8,10-tetraoxa-3,9-diphosphaspiro[5.5]undecane; tetrakis(2,4-di-tert-butylphenyl)-4,4'-bis(diphenylene)phosphonite; distearyl pentaerythritol diphosphite; diisodecyl pentaerythritol diphosphite; 2,4,6-tri-tert-butylphenyl-2-butyl-2-ethyl-1,3-propanediol phosphite; tristearyl sorbitol triphosphite; tetrakis(2,4-di-tert-butylphenyl)-4,4'-biphenylene diphosphonite; (2,4,6-tri-tert-butylphenyl)-2-butyl-2-ethyl-1,3-propanediolphosphite; triisodecylphosphite; and mixtures of phosphites containing at least one of the foregoing. In one embodiment the antioxidant used includes at least one of tris(2,4-di-tert-butylphenyl) phosphite; 2,4,6-tri-tert-butylphenyl-2-butyl-2-ethyl-1,3-propanediol phosphite; bis(2, 4-di-tert-butylphenyl)pentaerythritol diphosphite, as well as mixtures of phosphites containing at least one of the foregoing phosphates.

Non-limiting examples of UV stabilizers that can be used include 2-(2'-hydroxyphenyl)-benzotriazoles, e.g., the 5'-methyl-;3',5'-di-tert.-butyl-; 5'-tert.-butyl-; 5'-(1,1,3,3-tetramethylbutyl)-; 5-chloro-3',5'-di-tert.-butyl-; 5-chloro-3'-tert.-butyl-5'-methyl-; 3'-sec.-butyl-5'-tert.-butyl-; 3'-alpha-methylbenzyl-5'-methyl; 3'-alpha-methylbenzyl-5'-methyl-5-chloro-; 4'-hydroxy-; 4'-hydroxy-; 4'-methoxy-; 4'-octoxy-; 3',5'-di-tert.-amyl-; 3'-methyl-5'-carbomethoxyethyl-; 5-chloro-3',5'-di-tert.-amyl-derivatives; and Tinuvin® 234 (available from Ciba Specialty Chemicals). Also suitable are the 2,4-bis-(2'-hydroxyphenyl)-6-alkyl-s-triazines, e.g., the 6-ethyl-; 6-heptadecyl- or 6-undecyl-derivatives. 2-Hydroxybenzophenones e.g., the 4-hydroxy-; 4-methoxy-; 4-octoxy-; 4-decyloxy-; 4-dodecyloxy-; 4-benzyloxy-; 4,2',4'-trihydroxy-; 2,2',4,4'-tetrahydroxy- or 2'-hydroxy-4,4'-dimethoxy-derivative. 1,3-bis(2'-Hydroxybenzoyl)-benzenes, e.g., 1,3-bis-(2'-hydroxy-4'-hexyloxybenzoyl)-benzene; 1,3-bis-(2'-hydroxy-4'-octyloxybenzoyl)-benzene or 1,3-bis-(2'-hydroxy-4'-dodecyloxybenzoyl)-benzene may also be employed. Esters of optionally substituted benzoic acids, e.g., phenylsalicylate; octylphenylsalicylate; dibenzoylresorcin; bis-(4-tert.-butylbenzoyl)-resorcin; benzoylresorcin; 3,5-di-tert.-butyl-4-hydroxybenzoic acid-2,4-di-tert.-butylphenyl ester or -octadecyl ester or -2-methyl-4,6-di-tert.-butyl ester may likewise be employed. Acrylates, e.g., alpha-cyano-beta, beta-diphenylacrylic acid-ethyl ester or isooctyl ester, alpha-carbomethoxy-cinnamic acid methyl ester, alpha-cyano-beta-methyl-p-methoxy-cinnamic acid methyl ester or -butyl ester or N(beta-carbomethoxyvinyl)-2-methyl-indoline may likewise be employed. Oxalic acid diamides, e.g., 4,4'-di-octyloxy-oxanilide; 2,2'-di-octyloxy-5,5'-di-tert.-butyl-oxanilide; 2,2'-di-dodecyloxy-5,5-di-tert.-butyl-oxanilide; 2-ethoxy-2'-ethyl-oxanilide; N,N'-bis-(3-dimethyl-aminopropyl)-oxalamide; 2-ethoxy-5-tert.-butyl-2'-ethyloxanilide and the mixture thereof with 2-ethoxy-2'-ethyl-5,4'-di-tert.-butyl-oxanilide; or mixtures of ortho- and para-methoxy- as well as of o- and p-ethoxy-disubstituted oxanilides are also suitable as UV stabilizers. In one embodiment, the ultraviolet light absorber used in the instant composition includes at least one of 2-(2-hydroxy-5-methylphenyl)-2H-benzotriazole; 2-(2-hydroxy-3,5,-di-tert-amylphenyl)-2H-benzotriazole; 2-[2-hydroxy-3,5-di-(alpha,alpha-dimethylbenzyl)phenyl]-2H-benzotriazole; 2-(2-hydroxy-5-tert-octylphenyl)-2H-benzotriazole; 2-hydroxy-4-octyloxybenzophenone; nickel bis(O-ethyl 3,5-di-tert-butyl-4-hydroxybenzylphosphonate); 2,4-dihydroxybenzophenone; 2-(2-hydroxy-3-tert-butyl-5-methylphenyl)-2H-benzotriazole; nickel butylamine complex with 2,2'-thiobis(4-tert-butylphenol); 2-ethoxy-2'-ethyloxanilide; 2-ethoxy-2'-ethyl-5,5'-ditert-butyloxanilide and mixtures thereof.

The thermoplastic composition may further comprise one or more visual effects additives, sometimes known as visual effects pigments or visual effect enhancers. The visual effects additives may be present in an encapsulated form, a non-encapsulated form, or laminated to a particle comprising polymeric resin. Some non-limiting examples of visual effects additives are aluminum, gold, silver, copper, nickel, titanium, stainless steel, nickel sulfide, cobalt sulfide, manganese sulfide, metal oxides, white mica, black mica, pearl mica, synthetic mica, mica coated with titanium dioxide, metal-coated glass flakes, and colorants, including but not limited, to Perylene Red. The visual effect additive may have a high or low aspect ratio and may comprise greater than 1 facet. Dyes may be employed such as Solvent Blue 35, Solvent Blue 36, Disperse Violet 26, Solvent Green 3, Anaplast Orange LFP, Perylene Red, and Morplas Red 36. Fluorescent dyes may also be employed including, but not limited to, Permanent Pink R (Color Index Pigment Red 181, from Clariant Corporation), Hostasol Red 5B (Color Index #73300, CAS # 522-75-8, from Clariant Corporation) and Macrolex Fluorescent Yellow 10GN (Color Index Solvent Yellow 160:1, from Bayer Corporation). It is also contemplated that pigments such as titanium dioxide, zinc sulfide, carbon black, cobalt chromate, cobalt titanate, cadmium sulfides, iron oxide, sodium aluminum sulfosilicate, sodium sulfosilicate, chrome antimony titanium rutile, nickel antimony titanium rutile, and zinc oxide may be employed. Visual effect additives in encapsulated form usually comprise a visual effect material such as a high aspect ratio material like aluminum flakes encapsulated by a polymer. The encapsulated visual effect additive has the shape of a bead. At least one cross-linking agent may be included in the polymer material (i.e., the encapsulating material) surrounding the high aspect ratio particles, and the inclusion of a cross-linking agent is of particular importance when a suspension polymerization process is employed for the encapsulation. In some embodiments the inclusion of a cross-linking agent may impart mechanical strength and/or melt stability to the pigment beads when they are processed in a composition to make a final extruded or molded product. An illustrative cross-linking agent is divinylbenzene. The amount of cross-linking agent employed may affect the physical properties of the final product.

The catalyst quenchers that may be included in the composition are described in detail in U.S. Pat. No. 5,441,997. It is desirable to select the correct quencher to avoid color formation and loss of clarity to the polyester polycarbonate blend. In one embodiment phosphoric acid is used as the catalyst quencher.

Non-limiting examples of mold release compositions include esters of long-chain aliphatic acids and alcohols such as pentaerythritol, guerbet alcohols, long-chain ketones, siloxanes, alpha-olefin polymers, long-chain alkanes and hydrocarbons having 15 to 600 carbon atoms.

The optional fire retardant may comprise a halogen based flame retardant, a sulfonate salt flame retardant or a phosphate based flame retardant. When the composition comprises flammable components such as alkylaromatic copolymers the flame retardant used generally comprises an organic phosphate flame retardant. Typically the organic phosphate flame retardant is an aromatic phosphate compound of the formula XXIII,

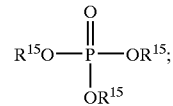

(XXIII)

where $R^{15}$ is independently at each occurrence an alkyl, cycloalkyl, aryl, alkyl substituted aryl, halogen substituted aryl, aryl substituted alkyl, halogen, or a combination of any of the foregoing, with the proviso that at least one $R^{15}$ is aryl or alkyl substituted aryl.

Non limiting examples of organic phosphate flame retardant include phenyl bisdodecyl phosphate; phenyl bisneopentyl phosphate; phenyl-bis (3,5,5'-tri-methyl-hexyl phosphate); ethyl diphenyl phosphate; 2-ethyl-hexyldi)p-tolyl) phosphate; bis-(2-ethylhexyl) p-tolyl phosphate; tritolyl phosphate; bis-(2-ethylhexyl) phenyl phosphate; tri-(nonylphenyl) phosphate; di(dodecyl) p-tolyl phosphate; tricresyl phosphate; triphenyl phosphate; dibutylphenyl phosphate; 2-chloroethyldiphenyl phosphate; p-tolyl bis(2,5,5'-trimethylhexyl) phosphate; 2-ethylhexyldiphenyl phosphate and the like. Suitable phosphates used may be those in which each $R^{15}$ is aryl. In one embodiment the phosphate used is triphenyl phosphate, which may be either unsubstituted or substituted, for example, isopropylated triphenyl phosphate.

Alternatively, the organic phosphate may be a di- or polyfunctional compound or polymer having the formula XXIV, XXV or XXVI

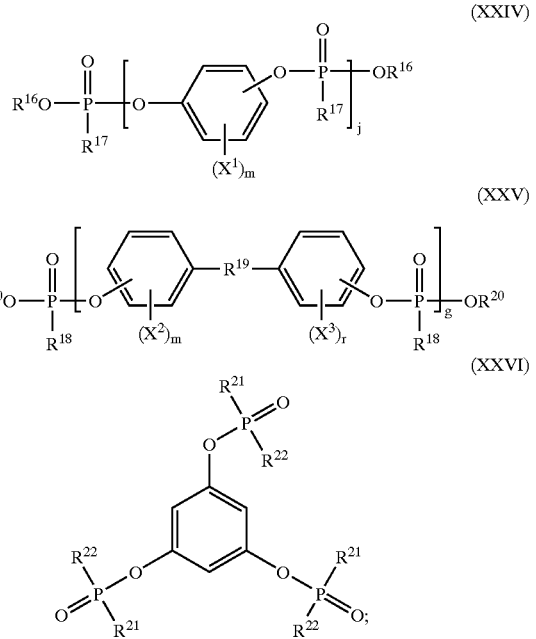

including mixtures thereof, in which $R^{16}$, $R^{19}$ and $R^{20}$ are, independently at each occurrence, hydrocarbon comprising 1 to 30 carbons; $R^{17}$, $R^{18}$, $R^{21}$ and $R^{22}$ are, independently at each occurrence, hydrocarbon or hydrocarbon-oxy comprising 1 to 30 carbons; $X^1$, $X^2$ and $X^3$ are halogen; m and r represent integers from 0 to 4, and j and g represent integers from 1 to 30.

Examples include the bis diphenyl phosphates of resorcinol, hydroquinone and bisphenol-A, respectively, their oligomeric and polymeric counterparts and combination of the foregoing.

Methods for the preparation of the aforementioned di- and polyfunctional aromatic phosphates are described in British Patent No. 2,043,083.

Cyclic phosphates, for example, diphenyl pentaerythritol diphosphate, as is described by Axelrod in U.S. Pat. No. 4,254,775 may also be used as fire retardants in the thermoplastic composition.

Also suitable as fire-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl) phosphine oxide, or tetrakis (hydroxymethyl) phosphonium chloride. These flame-retardant additives are commercially available.

Suitable phosphate fire retardants include those based upon resorcinol such as, for example, resorcinol tetraphenyl diphosphate, as well as those based upon bis-phenols such as, for example, bis-phenol A tetraphenyl diphosphate. Phosphates containing substituted phenyl groups are also contemplated.

In the final composition, the fire retardant is present in at least the minimum amount necessary to impart a desired degree of flame retardancy to the composition. Flame retardancy may be measured in a variety of ways such as UL94, IEC60695-11-20, IEC 60695-11-10, NF F16-101, NF P92-501, BS476, BS6853, DIN4102, and DIN5510. In one embodiment, the flame retardant is present in the minimum amount necessary to pass the UL-94 protocol at a rating of V-0, V-1, V-2, 5VB, or 5VA depending on the specific application requirements.

In general, the particular amount of fire retardant will vary, depending on the molecular weight of the organic phosphate, the amount of the flammable resin present and possibly other normally flammable ingredients, which might also be included in the composition. The organic phosphate flame retardants are generally present in the blends in amounts of 2 to 35 weight percent based on the total weight of the composition without reinforcing agent, or, more specifically, 5 to 30 weight percent, or, even more specifically, 5 to 15 weight percent, based on the total weight of the composition without reinforcing agent.

The composition also optionally includes an anti-drip agent such as a fluoropolymer. The fluoropolymer may be a fibril forming or non-fibril forming fluoropolymer. The fluoropolymer generally used is a fibril forming polymer. In some embodiments the fluoropolymer comprises polytetrafluoroethylene. In some embodiments an encapsulated fluoropolymer may be employed i.e. a fluoropolymer encapsulated in a polymer. An encapsulated fluoropolymer may be made by polymerizing the polymer in the presence of the fluoropolymer. Alternatively, the fluoropolymer may be pre-blended in some manner with a second polymer, such as for, example, an aromatic polycarbonate resin or a styrene-acrylonitrile resin as in, for example, U.S. Pat. Nos. 5,521,230 and 4,579,906 to form an agglomerated material for use as an anti-drip agent. Either method may be used to produce an encapsulated fluoropolymer.

The anti-drip agent, when present, comprises 0.1 to 5 weight percent, more specifically 0.5 to 3.0 weight percent and most specifically 1.0 to 2.5 weight percent based on the total weight of the composition without reinforcing agent.

The thermoplastic composition may optionally comprise an impact modifier. The impact modifier resin added to the thermoplastic composition in an amount of 1% to 30% by weight, based on the total weight of the composition, may comprise one of several different rubbery modifiers such as graft or core shell rubbers or combinations of two or more of these modifiers. For example, the impact modifiers may comprise acrylic rubber, ASA rubber, diene rubber, organosiloxane rubber, ethylene propylene diene monomer (EPDM) rubber, styrene-butadiene-styrene (SBS) rubber, styrene-ethylene-butadiene-styrene (SEBS) rubber, acrylonitrile-butadiene-styrene (ABS) rubber, methacrylate-butadiene-styrene (MBS) rubber, styrene acrylonitrile copolymer or glycidyl ester impact modifier.

The term acrylic rubber modifier may refer to multi-stage, core-shell, interpolymer modifiers having a cross-linked or partially crosslinked (meth)acrylate rubbery core phase, for example, butyl acrylate. Associated with this cross-linked acrylic ester core is an outer shell of an acrylic or styrenic resin, generally methyl methacrylate or styrene, which interpenetrates the rubbery core phase. Incorporation of small amounts of other monomers such as acrylonitrile or (meth) acrylonitrile within the resin shell also provides suitable impact modifiers. The interpenetrating network is provided when the monomers forming the resin phase are polymerized and cross-linked in the presence of the previously polymerized and cross-linked (meth)acrylate rubbery phase.

Suitable impact modifiers are graft or core shell structures with a rubbery component with a Tg below 0° C., more specifically between −40° to −80° C., composed of poly alkylacrylates or polyolefins grafted with polymethylmethacrylate (PMMA) or styrene acrylonitrile (SAN). Specifically the rubber content is at least 10 wt %, more specifically greater than 40 wt %, and most specifically between 40 and 75 wt %.

Especially suitable impact modifiers are the butadiene core-shell polymers of the type available from Rohm & Haas, for example Paraloid® EXL2600. Most suitable impact modifier will comprise a two stage polymer having a butadiene based rubbery core and a second stage polymerized from methylmethacrylate alone or in combination with styrene. Other suitable rubbers are the ABS types Blendex® 336 and 415, available from GE Specialty Chemicals. Both rubbers are based on impact modifier resin of SBR rubber. Although several rubbers have been described, many more are commercially available. Any rubber may be used as an impact modifier as long as the impact modifier does not negatively impact the physical or aesthetic properties of the thermoplastic composition.

The composition may further comprise one or more reinforcing agents, including low-aspect ratio fillers, fibrous fillers, and polymeric fillers. Examples of such fillers well known to the art include those described in "Plastic Additives Handbook, $4^{th}$ Edition" R. Gachter and H. Muller (eds.), P. P. Klemchuck (assoc. ed.) Hansen Publishers, New York 1993. Non-limiting examples of fillers include silica powder, such as fused silica, crystalline silica, natural silica sand, and various silane-coated silicas; talc, including fibrous, modular, needle shaped, and lamellar talcs; glass spheres, both hollow and solid, and surface-treated glass spheres; kaolin, including hard, soft, and calcined kaolin; mica, including metallized mica and mica surface treated with aminosilanes or acryloylsilanes coatings to impart good physicals to compounded blends; feldspar and nepheline syenite; silicate spheres; cenospheres; fillite; aluminosilicate (armospheres), including silanized and metallized aluminosilicate; quartz; quartzite; perlite; Tripoli; diatomaceous earth; silicon carbide; molybdenum sulfide; zinc sulfide; aluminum silicate (mullite); synthetic calcium silicate; zirconium silicate; barium titanate; barium ferrite; barium sulfate and heavy spar; particulate or fibrous aluminum, bronze, zinc, copper and nickel; graphite, such as graphite powder; flaked fillers and reinforcements such as glass flakes, flaked silicon carbide, aluminum diboride, aluminum flakes, and steel flakes; processed mineral fibers such as those derived from blends comprising at least one of aluminum silicates, aluminum oxides, magnesium oxides, and calcium sulfate hemihydrate; natural fibers including wood flour, cellulose, cotton, sisal, jute, starch, cork flour, lignin, ground nut shells, corn, rice grain husks; synthetic reinforcing fibers, including polyester fibers such as polyethylene terephthalate fibers, polyvinylalcohol fibers, aromatic polyamide fibers, polybenzimidazole fibers, polyimide fibers, polyphenylene sulfide fibers, polyether ether ketone fibers, boron fibers, ceramic fibers such as silicon carbide, fibers from mixed oxides of aluminum, boron and silicon; single crystal fibers or "whiskers" including silicon carbide fibers, alumina fibers, boron carbide fibers, iron fibers, nickel fibers, copper fibers; glass fibers, including textile glass fibers such as E, A, C, ECR, R, S, D, and NE glasses, and quartz; vapor-grown carbon fibers include those having an average diameter of 3.5 to 500 nanometers as described in, for example, U.S. Pat. Nos. 4,565,684 and 5,024,818 to Tibbetts et al., 4,572,813 to Arakawa; 4,663,230 and 5,165,909 to Tennent, 4,816,289 to Komatsu et al., 4,876,078 to Arakawa et al., 5,589,152 to Tennent et al., and 5,591,382 to Nahass et al.; and the like. Some reinforcing agents may also function as visual effects additives and some visual effects additives may also function as reinforcing agents.

When present, the reinforcing agent may be used in an amount of 2 to 40 parts by weight, more specifically 2 to 20 parts by weight and most specifically 5 to 20 parts by weight, per 100 parts by weight of the total resin.

Non-limiting examples of processing aids that can be used include Doverlube® FL-599 (available from Dover Chemical Corporation), Polyoxyter® (available from Polychem Alloy Inc.), Glycolube P (available from Lonza Chemical Company), pentaerythritol tetrastearate, Metablen A-3000 (available from Mitsubishi Rayon), neopentyl glycol dibenzoate, and the like.

The thermoplastic composition may be made by combining and mixing the components of the composition under conditions suitable for the formation of a blend of the components, such as for example, by melt mixing using, for example, a two-roll mill, a Banbury mixer or a single screw or twin-screw extruder, and, optionally, then reducing the composition so formed to particulate form, e.g., by pelletizing or grinding the composition. In some instances it some components may be added as part of a master batch. In general it is desirable to add fibrous fillers and visual effects additives downstream.

In some embodiments, one or more components may be added to the composition as an aqueous mixture or solution followed by devolatilization in appropriate processing equipment such as in an extruder. In another embodiment, some of the components may be mixed in aqueous solution and then evaporated to form a material which may be added to the remaining components.

In one embodiment, the composition after molding or extruding exhibits a transmission, measured on a 3.2 millimeter (mm) thick plaque according to ASTM E313-00, of 25% to 95% or, more specifically 35% to 85% or, even more specifically, 80% to 90% and a haze, measured on a 3.2 mm thick plaque according to ASTM E313-00 less than or equal to 5%. More specifically the haze may be less than or equal to 3%, or even more specifically less than or equal to 2%.

The thermoplastic compositions may also be evaluated by measuring the Blue to Yellow span i.e. B-Y span of the thermoplastic composition. The B-Y span is defined as the difference in the values of the yellowness index of transmission according to ASTM E313-00 and the yellowness index of reflection. The yellowness of index of reflection is measured using the same equipment and parameters as the yellowness index of transmission except that the equipment employs the reflection setting. Yellowness index is a measure of the tendency of plastics to turn yellow upon long-term exposure to light. Without being bound by theory it is believed that a lower B-Y span may indicate that the composition will retain clarity (a transmission greater than 25% as described above) for a longer time period and an increase in the yellowness index may indicate deterioration in the aesthetic and physical properties of the composition.

In one embodiment the B-Y Span of the composition after molding or extruding exhibits a value of 10 to 20. The B-Y span is defined as the blue to yellow span and is calculated as follows.

B-Y Span=Yellowness index in Transmission−Yellowness index in reflection.

Samples with scattering particles (typically 10–20 nm size) look bluish in reflection and yellowish in transmission. The measurement of YI (Yellowness Index) in both transmission and reflection modes helps to quantify the B-Y span. The YI in transmission is measured according to ASTM E313-00 on a 3.2 millimeter (mm) thick plaque. For measuring YI of reflection the same instrument, using the sample, is set to the reflection mode. The Yellowness index value for reflection is generally negative.

The thermoplastic resin compositions may be molded into useful shaped articles by a variety of means such as injection molding, extrusion, rotational molding, blow molding and thermoforming to form articles such as, for example, computer and business machine housings, hand held electronic device housings, and components of lighting fixtures, ornaments, home appliances, roofs, greenhouses, sun rooms, swimming pool enclosures, and the like.

The compositions described above may be used in the fabrication of sheets. Techniques for the extrusion of the sheets, including solid sheets, multi-wall sheets, and multi-wall sheets comprising hollow bodies, are known in the art and described in, for example, U.S. Pat. Nos. 3,476,627 to Squires, 3,565,985 to Schrenk et al., 3,668,288 to Takahashi, 3,918,865 to Nissel, 3,933,964 to Brooks, 4,477,521 to Lehmann et al., and 4,707,393 to Vetter. There is no particular limitation on the composition of additional layers used to form coextruded sheets. There is no particular limitation on the structure or geometry of the multi-wall sheets. The additional layers may comprise, for example, fluorescing agents to facilitate manufacturing and/or ultraviolet light absorbers to improve weatherability.

It is also contemplated that the thermoplastic composition may be utilized in multi-layer materials. One such example is as a cap layer on a substrate. Useful substrates would be those that that are compatible with the thermoplastic composition and would suffer little or no delamination under processing or normal use conditions. Multi-layer materials may be formed by a number of methods, including but not limited to co-extrusion, compression molding, and lamination.

The thermoplastic compositions are further illustrated by the following non-limiting examples.

EXAMPLES

Examples 1–4 and Comparative Examples 1–2: Preparation of blends

The individual components listed in Table 1 were weighed out separately and then blended in a Banbury mixer. The prepared compositions were used for the extrusion and molding operation using conditions shown below in Tables 2 and 3. The numbers indicate the weight percent of each component relative to the weight of the overall mixture formed by combining all of the indicated components. PC-ST refers to a polyorganosiloxane-polycarbonate block copolymer having a weight average molecular weight of 57,000 daltons. PCCD used was obtained from Eastman chemical company.

The compositions were extruded to form pellets, which were then molded using standard molds used for producing test specimens. Compounding was carried out using W&P ZSK 25 Laboratory Twin-Screw Extruder with standard screw design for polycarbonate polymers. Compounding conditions are given in Table 2. Injection moldings were carried out using L&T Demag De-Tech 60 LNC4-E molding machine. The abbreviation "RPM" stands for revolutions per minute. The abbreviation "psi" stands for pounds per square inch.

Transparency and Haze were measured in accordance with ASTM E313-00 on a Mac Beth Spectrophotometer-Color Eye 7000a and the B-Y span was calculated as follows. B-Y Span=Yellowness index (YI) in transmission-Yellowness index in reflection. For Measuring YI in transmission ASTM E313-00 method was employed. For measuring YI in reflection the spectrophotometer was in the reflection mode.

The melt volume rate (MVR) was measured on the extruded pellets, in accordance with ASTM D1238-01. MVR is defined as the volume of a sample that passes though an orifice with a piston when a sample of 6 to 7 grams is placed under a constant load of 1.2 kilograms at 300° C. in 10 minutes, with a dwell time of 5 minutes. Results are expressed in units of cubic centimeters per 10 minutes (cc/10 min).

Notched Izod impact (abbreviated as "NII") at −20° C. and at room temperature were measured in accordance with ASTM D256-03 using a 11 Joule hammer.

Weight average molecular weight ($M_w$) and number average molecular weight ($M_n$) were measured by gel permeation chromatography relative to polystyrene standards. "NA" indicates that data is not available.

TABLE 1

| Components of the composition | 1* | 2* | 3* | 1 | 2 | 3 | 4 |
|---|---|---|---|---|---|---|---|
| PC-ST (6.2% Si) [wt %] | 99.94 | 79.94 | 79.94 | 79.94 | 79.94 | 79.94 | 79.94 |
| PC105 [wt %][1] | 0.00 | 20.00 | 0.00 | 0.00 | 15.00 | 10.00 | 5.00 |
| OQ1050 [wt %] | 0.00 | 0.00 | 20.00 | 0.00 | 0.00 | 0.00 | 0.00 |
| PCCD4000 [wt %] | 0.00 | 0.00 | 0.00 | 20.00 | 5.00 | 10.00 | 15.00 |
| Additives (phosphite) [wt %] | 0.06 | 0.06 | 0.06 | 0.06 | 0.06 | 0.06 | 0.06 |
| Properties | | | | | | | |
| % Transmission @ 3.2 mm | 86.7 | 86.0 | 89.2 | 89.0 | 86.5 | 86.9 | 88.2 |
| % Haze | 2.1 | 2.3 | 1.9 | 1.3 | 2.0 | 1.6 | 1.5 |
| B-Y Span | 21.9 | 26.6 | 21.5 | 12.2 | 18.5 | 16.4 | 14.1 |
| NII at −20° C. (joules per meter) | 699 | 833 | NA | 886 | 817 | 758 | 822 |
| NII at 24° C. (joules per meter) | 837 | 929 | 881 | 988 | 961 | 988 | 1041 |
| MVR cc/10 minutes | 8.9 | 8.2 | 14.5 | NA | NA | 11.5 | 12.0 |
| Tg (° C.) | 147.5 | 149.5 | NA | 129.0 | 142.0 | 138.0 | 134.5 |

[1]PC105: Mw = 61,643 & Mn = 24,123
[2]PC-ST: Mw = 45,126 & Mn = 19,281
[3]OQ1050 = low molecular weight PC, Mw = 34000
*Comparative examples Table 1 clearly indicates that the B-Y span values decrease when PCCD is blended with PCST and still retains impact strength comparable to polyorganosiloxane/polycarbonate block copolymer at −20° C.

TABLE 2

| Process Parameter | Value |
|---|---|
| Temperature Feeding Zone | 150° C. |
| Temperature Zone 1 | 220–230° C. |
| Temperature Zone 2 | 250–260° C. |
| Temperature Zone 3 | 275–280° C. |
| Temperature Zone 4 | 280–285° C. |
| Temperature of Throat/Die | 285° C. |
| Vacuum Applied? | Yes |
| Screw Speed | 300 RPM |
| Torque | 50–60% |

TABLE 3

| Process Parameter | Value |
|---|---|
| Temperature Feeding Zone | 70–90° C. |
| Temperature Zone 1 | 250–260° C. |

TABLE 3-continued

| Process Parameter | Value |
| --- | --- |
| Temperature Zone 2 | 260–270° C. |
| Temperature Zone 3 | 280–285° C. |
| Temperature of Nozzle | 280–285° C. |
| Temperature of Melt | 300° C. |
| Temperature of Mold | 80° C. |
| Sample Drying Time | 4 Hours |
| Sample Drying Temperature | 120° C. |
| Cycle Time | 35 Seconds |
| Injection time | 3 Seconds |
| Injection Speed | 1 inch/second |
| Injection Pressure | 1100 Psi |
| Decompression | 1 Inch |
| Switch Point | 0.25 Inch |
| Screw Speed | 100 RPM |
| Holding Pressure | 800 Psi |
| Holding Time | 10 Seconds |
| Cooling Time | 15 Seconds |

While the invention has been described with reference to a specific embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents and other references are incorporated herein by reference in their entirety.

What is claimed is:

1. A thermoplastic composition comprising;
1 to 30 weight percent, based on total weight of said thermoplastic composition, of a cycloaliphatic polyester wherein said cycloaliphatic polyester consists essentially of repeating units of formula:

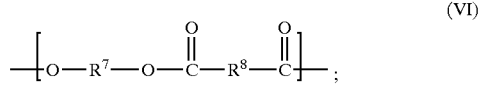  (VI)

wherein $R^7$ and $R^8$ are independently at each occurrence selected from the group consisting of an aliphatic group having 6 to 20 carbon atoms and a cycloalkane having 6 to 20 carbon atoms, with the proviso that at least one of $R^7$ and $R^8$ is a cycloalkyl containing radical; and greater than or equal to 40 weight percent, based on total weight of said thermoplastic composition, of a polyorganosiloxane/polycarbonate block copolymer, wherein said composition has a B-Y span of less than or equal to 20.

2. The thermoplastic composition of claim 1, wherein the polyorganosiloxane/polycarbonate block copolymer comprises polyorganosiloxane domains having an average domain size less than or equal to 45 nanometers.

3. The composition of claim 1, further comprising 10 to 50 weight percent of a polycarbonate, based on total weight of said thermoplastic composition.

4. The composition of claim 1, comprising 5 to 25 weight percent of said cycloaliphatic polyester, based on total weight of said thermoplastic composition.

5. The composition of claim 1, comprising 10 to 20 weight percent of said cycloaliphatic polyester, based on total weight of said thermoplastic composition.

6. The composition of claim 1, wherein the polyorganosiloxane/polycarbonate block copolymer comprises a polyorganosiloxane blocks comprising, on average, greater than or equal to ten siloxane units.

7. The composition of claim 1, wherein the polyorganosiloxane/polycarbonate block copolymer comprises a polydimethylsiloxane/polycarbonate block copolymer comprising 0.5 to 80 weight percent by weight polydimethylsiloxane based on the total weight of the block copolymer.

8. The composition of claim 1, wherein the cycloaliphatic polyester comprises of cycloaliphatic diacid and cycloaliphatic diol units.

9. The composition of claim 1 wherein the cycloaliphatic polyester comprises polycyclohexane dimethanol cyclohexane dicarboxylate.

10. The composition of claim 1, wherein the polyorganosiloxane/polycarbonate block copolymer comprises a polydimethylsiloxane/bisphenol-A polycarbonate block copolymer.

11. The composition of claim 1, wherein said composition has a percentage transmission of greater than or equal to 25 measured in accordance with ASTM E313-00.

12. The composition of claim 1, further comprising a colorant, filler, fire retardant, UV stabilizer, antistatic agent, acid scavenger, visual effects enhancer or mixtures thereof.

13. The composition of claim 1, wherein the composition has a notched Izod impact measured in accordance with ASTM D256-03 of greater than or equal to 420 Joules per meter at −20° C.

14. The composition of claim 1, wherein the composition has a notched Izod impact measured in accordance with ASTM D256-03 of greater than or equal to 420 Joules per meter at 24° C.

15. The composition of claim 1, wherein the composition has a melt volume rate measured in accordance with ASTM D1238-01 of 5 to 40 cubic centimeters/10 minutes.

16. An article comprising the composition of claim 1.

17. A method of making a thermoplastic composition comprising:
mixing 1 to 30 weight percent, based on total weight of said thermoplastic composition, of a cycloaliphatic polyester wherein said cycloaliphatic polyester consists essentially of repeating units of formula:

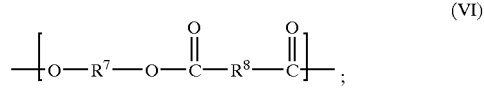  (VI)

wherein $R^7$ and $R^8$ are independently at each occurrence selected from the group consisting of an aliphatic group having 6 to 20 carbon atoms and a cycloalkane having 6 to 20 carbon atoms, with the proviso that at least one of $R^7$ and $R^8$ is a cycloalkyl containing radical; and greater than or equal to 40 weight percent, based on total weight of said thermoplastic composition, of a polyorganosiloxane/polycarbonate block copolymer comprising polyorganosiloxane domains having an average domain size less than or equal to 45 nanometers.

18. A composition comprising:
10 to 15 weight percent of a cycloaliphatic polyester based on total weight of said thermoplastic composition, wherein said cycloaliphatic polyester consists essentially of repeating units of formula:

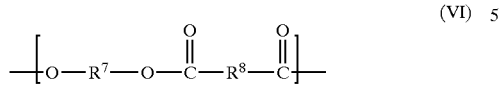
(VI)

wherein $R^7$ and $R^8$ are independently at each occurrence selected from the group consisting of an aliphatic group having 6 to 20 carbon atoms and a cycloalkane having 6 to 20 carbon atoms, with the proviso that at least one of $R^7$ and $R^8$ is a cycloalkyl containing radical; and greater than or equal to 40 weight percent, based on total weight of said thermoplastic composition, of a polydimethylsiloxane/bisphenol-A polycarbonate block copolymer comprising polydimethylsiloxane domains having an average domain size less than or equal to 25 nanometers.

19. The composition of claim 18, wherein the composition has a B-Y span of less than or equal to 20.

20. A thermoplastic composition comprising;
1 to 30 weight percent, based on total weight of said thermoplastic composition, of a cycloaliphatic polyester wherein said cycloaliphatic polyester consists essentially of repeating units of formula:

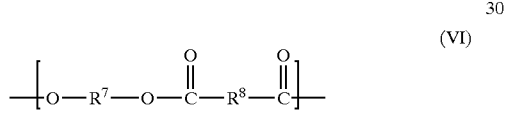
(VI)

wherein $R^7$ and $R^8$ are independently at each occurrence selected from the group consisting of an aliphatic group having 6 to 20 carbons and a cyclealkane having 6 to 20 carbon atoms, with the proviso that at least one of $R^7$ and $R^8$ is a cycloalkyl containing radical; and greater than or equal to 40 weight percent, based on total weight of said thermoplastic composition, of a polyorganosiloxane/polycarbonate block copolymer comprising polyorganosiloxane domains having an average domain size less than or equal to 45 nanometers.

21. A transparent thermoplastic composition comprising:
1 to 30 weight percent of a cycloaliphatic polyester based on total weight of said thermoplastic composition, wherein said cycloaliphatic polyester consists essentially of repeating units of formula:

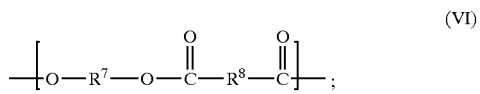
(VI)

wherein $R^7$ and $R^8$ are independently at each occurrence selected from the group consisting of an aliphatic group having 6 to 20 carbon atoms and a cycloalkane having 6 to 20 carbon atoms, with the proviso that at least one of $R^7$ and $R^8$ is a cycloalkyl containing radical; and greater than or equal to 40 weight percent, based on total weight of said thermoplastic composition, of a polyorganosiloxane/polycarbonate block copolymer wherein the composition has a light transmission of greater than or equal to 25% as measured by ASTM E313-00 on a 3.2 millimeter thick plaque.

22. The composition of claim 21, wherein the polyorganosiloxane/polycarbonate block copolymer comprises polyorganosiloxane domains having an average domain size less than or equal to 45 nanometers.

23. The composition of claim 21, wherein the composition has a B-Y span of less than or equal to 20.

* * * * *